US012625859B2

(12) United States Patent
Louizos et al.

(10) Patent No.: US 12,625,859 B2
(45) Date of Patent: May 12, 2026

(54) METHODS AND SYSTEMS FOR DETECTING SPURIOUS DATA PATTERNS

(71) Applicant: Fraud.net, Inc., New York, NY (US)

(72) Inventors: Louizos Alexandros Louizos, New York, NY (US); Ayaan Chaudhry, Toronto (CA); Gary Plunkett, Bellingham, WA (US); Oliver Clark, New York, NY (US); Cathy Ross, New York, NY (US); R. Whitney Anderson, New York, NY (US)

(73) Assignee: Fraud.net, Inc., New York, NY (US)

( * ) Notice: Subject to any disclaimer, the term of this patent is extended or adjusted under 35 U.S.C. 154(b) by 0 days.

(21) Appl. No.: 18/595,518

(22) Filed: Mar. 5, 2024

(65) Prior Publication Data

US 2024/0346008 A1     Oct. 17, 2024

Related U.S. Application Data

(63) Continuation of application No. 17/100,195, filed on Nov. 20, 2020, now Pat. No. 11,921,697.
(Continued)

(51) Int. Cl.
*G06F 16/23* (2019.01)
*G06F 16/28* (2019.01)
(Continued)

(52) U.S. Cl.
CPC ........ *G06F 16/2365* (2019.01); *G06F 16/285* (2019.01); *G06N 3/04* (2013.01);
(Continued)

(58) Field of Classification Search
CPC ..... G06F 16/2365; G06F 16/285; G06N 3/04; G06N 3/08; G06Q 10/10; G06Q 30/0185
See application file for complete search history.

(56) References Cited

U.S. PATENT DOCUMENTS 5,052,043 A     9/1991   Gaborski
2005/0273449 A1* 12/2005   Peacock ................. G06N 3/084
                                          706/16
(Continued)

OTHER PUBLICATIONS

NPL: Sakti Saurav, et al. (2018). Online anomaly detection with concept drift adaptation using recurrent neural networks (Year: 2018).

(Continued)

*Primary Examiner* — Mark E Hershley
*Assistant Examiner* — Dustin D Eyers
(74) *Attorney, Agent, or Firm* — Potomac Law Group, PLLC

(57)     ABSTRACT

Disclosed are implementations that include a method for detecting anomalous data, including converting a set of data values representative of a multi-dimensional item into a nodes-and-edges graph representation of the item, applying a graph convolution process to the graph representation to generate a transformed graph representation for the item comprising a resultant transformed configuration of the nodes and edges representing the item, and determining, based on the transformed configuration, a probability that the item is anomalous. Another example method includes receiving input data at a neural network circuit comprising a plurality of node layers, with each of the plurality of node layers comprising respective one or more nodes, with the neural network circuit further comprising adjustable weighted connections connecting at least some nodes in different layers of the plurality of node layers. The method further includes removing one or more of the weighted connections at one or more time instances.

20 Claims, 11 Drawing Sheets

100

Training data

Related U.S. Application Data

(60) Provisional application No. 62/939,236, filed on Nov. 22, 2019.

(51) Int. Cl.

| | |
|---|---|
| *G06N 3/04* | (2023.01) |
| *G06N 3/08* | (2023.01) |
| *G06Q 10/10* | (2023.01) |
| *G06Q 30/018* | (2023.01) |

(52) U.S. Cl.
CPC ............... *G06N 3/08* (2013.01); *G06Q 10/10* (2013.01); *G06Q 30/0185* (2013.01)

(56) References Cited

U.S. PATENT DOCUMENTS

| | | | |
|---|---|---|---|
| 2006/0036372 | A1 | 2/2006 | Yener et al. |
| 2006/0112028 | A1* | 5/2006 | Xiao ........................ G06N 3/08 706/15 |
| 2011/0264482 | A1 | 10/2011 | Rahmouni et al. |
| 2016/0300275 | A1 | 10/2016 | Kapoor et al. |
| 2016/0358099 | A1 | 12/2016 | Sturlaugson et al. |
| 2017/0140260 | A1 | 5/2017 | Manning et al. |
| 2017/0195354 | A1 | 7/2017 | Kesin et al. |
| 2017/0337472 | A1 | 11/2017 | Durdanovic et al. |
| 2018/0174025 | A1 | 6/2018 | Jin |
| 2018/0268289 | A1 | 9/2018 | Wong |
| 2019/0005377 | A1 | 1/2019 | Malaya |
| 2019/0042743 | A1 | 2/2019 | Chen |
| 2019/0087729 | A1 | 3/2019 | Byun et al. |
| 2019/0188567 | A1 | 6/2019 | Yao et al. |
| 2019/0199626 | A1 | 6/2019 | Thubert et al. |
| 2019/0228312 | A1 | 7/2019 | Andoni et al. |
| 2019/0238568 | A1 | 8/2019 | Goswami et al. |
| 2019/0251442 | A1 | 8/2019 | Koivisto et al. |
| 2019/0279094 | A1 | 9/2019 | Baughman et al. |
| 2019/0311220 | A1 | 10/2019 | Hazard et al. |
| 2019/0333222 | A1 | 10/2019 | Gatti |
| 2019/0362235 | A1 | 11/2019 | Xu et al. |
| 2020/0034645 | A1* | 1/2020 | Fan ..................... G06F 18/2413 |
| 2020/0042434 | A1 | 2/2020 | Albertson et al. |
| 2020/0097857 | A1 | 3/2020 | Hawkins et al. |
| 2020/0104716 | A1 | 4/2020 | Venkatesha et al. |
| 2020/0125953 | A1 | 4/2020 | Yoo et al. |
| 2020/0143203 | A1 | 5/2020 | Liang |
| 2020/0364573 | A1 | 11/2020 | Ramachandran et al. |
| 2020/0410157 | A1 | 12/2020 | van dDe Kerkhof et al. |
| 2021/0027133 | A1 | 1/2021 | Ludwig et al. |
| 2021/0081798 | A1 | 3/2021 | Cho et al. |
| 2021/0262204 | A1 | 8/2021 | Tafazoli Bilandi et al. |
| 2023/0196753 | A1 | 6/2023 | Yun et al. |

OTHER PUBLICATIONS

NPL: Sheraz Naseer, et al. (2018). Enhanced Network Anomaly Detection Based on Deep Neural Networks (Year:2018).

Luo et al., "ThiNet: Pruning CNN Filters for a Thinner Net," IEEE Transactions on Pattern Analysis and Machine Intelligence, vol. 41, No. 10, pp. 2525-2538, Oct. 2019.

Chang et al., "Dropout Feature Ranking for Deep Learning Models," arXiv, Mar. 2018.

Yu et al., "NISP: Pruning Networks using Neuron Importance Score Propagation," 2018 IEEE/CVF Conference on Computer Vision and Pattern Recognition, Jun. 2018.

* cited by examiner

700

710

730

720

Global update 830

$N_{av}$ = average $(N_1, N_2, \ldots, N_N)$

Global MLP 832

$G \rightarrow G'$

Node update 820

For each node N:

For each incoming edge E: 822

Node MLP $N'_E$ $N'$ = average $(N'_1, N'_2, \ldots, N'_E)$

Edge update 810

For each edge E:

Edge MLP 812

$E'$

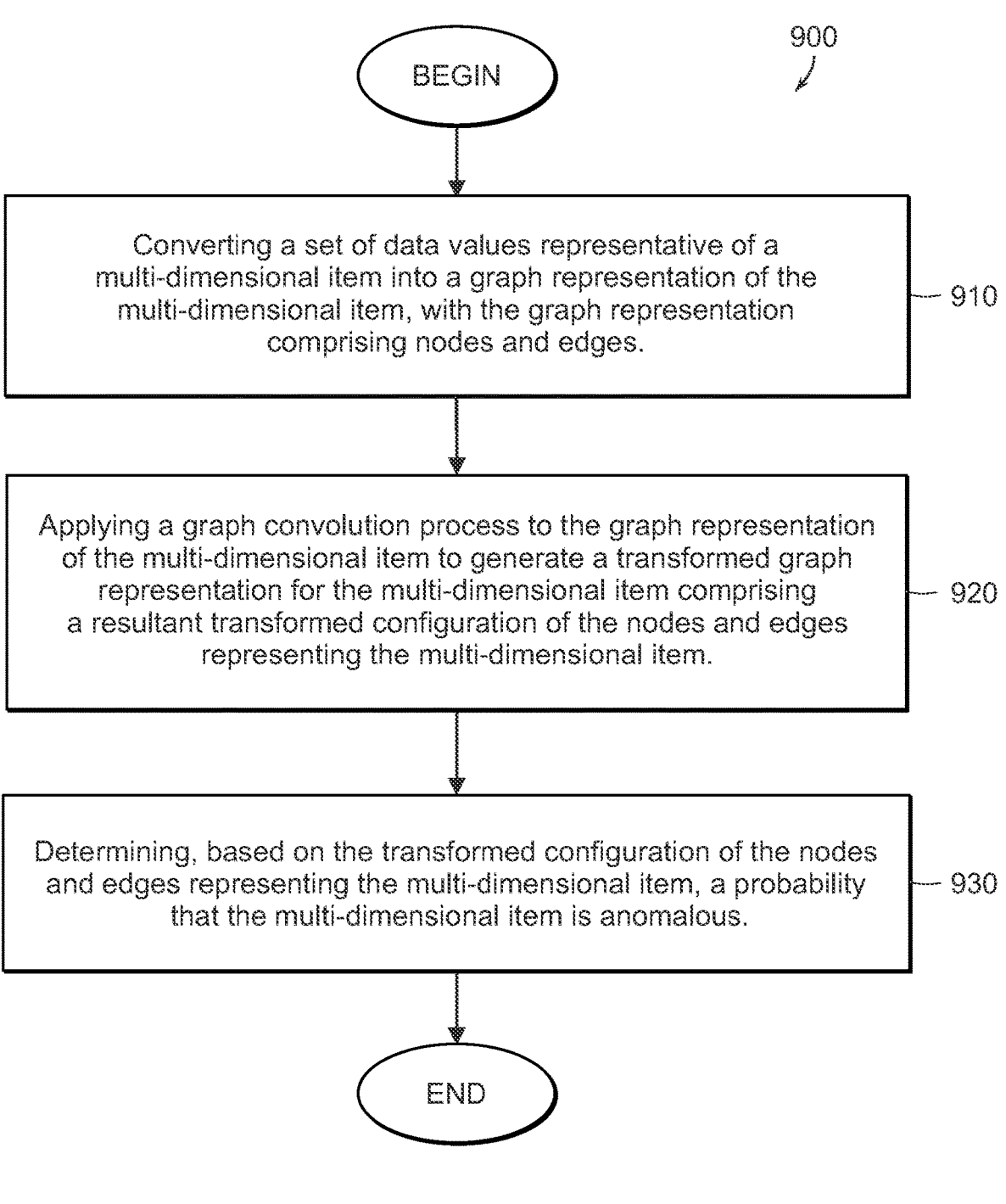

900

BEGIN

Converting a set of data values representative of a multi-dimensional item into a graph representation of the multi-dimensional item, with the graph representation comprising nodes and edges. — 910

Applying a graph convolution process to the graph representation of the multi-dimensional item to generate a transformed graph representation for the multi-dimensional item comprising a resultant transformed configuration of the nodes and edges representing the multi-dimensional item. — 920

Determining, based on the transformed configuration of the nodes and edges representing the multi-dimensional item, a probability that the multi-dimensional item is anomalous. — 930

END

FIG. 9

METHODS AND SYSTEMS FOR DETECTING SPURIOUS DATA PATTERNS

CROSS-REFERENCE TO RELATED APPLICATIONS

This application is a continuation of U.S. application Ser. No. 17/100,195, filed Nov. 20, 2020, which claims priority to, and the benefit of, U.S. Provisional Application No. 62/939,236 entitled "METHODS AND SYSTEMS FOR DETECTING SPURIOUS DATA PATTERNS," and filed Nov. 22, 2019, the content of all of which are incorporated herein by reference in their entireties.

BACKGROUND

The ever-growing volume of electronic business and economic activity has been accompanied by a similar sharp increase in fraudulent and harmful electronic activity. Being able to robustly detect rare data patterns is beneficial in cases where anomalous behavior needs to be detected (e.g., through detection of data outliers) to prevent damage to devices or fraud in financial transactions.

SUMMARY

There is a need for robust detectors of spurious data patterns among a stream of data whether data source is sensors, financial transactions or server logs. In the present disclosure, a method and an apparatus for empowering the robust, fast and real time detection of spurious signals in data with a novel method and a device using a graph network methodology and/or a novel neural network topology is described. Analytical description of data preprocessing before data are fed as input to the system is also described.

Disclosed are systems, methods, and other implementations to identify outlier data records from a set of records processed by a learning machine. Examples of such records may be transaction records (e.g., credit card records), with respect to which a learning system is configured to detect anomalous (outlying) activity or behavior. Such anomalous activity may be indicative of possible fraudulent activity.

In the present disclosure, methods are described for using a neural network, or other types of learning machines, with specific configurations structured to robustly detect outliers in data streams. The novel neural network architectures of the present disclosure can be combined with a unique data preprocessing methodology to reduce the dimensionality of the input data based on specific data filters that maximize the entropy of the input data.

In some embodiments, the implementations described herein use graph network topologies and processing to identify outliers or anomalous data. A method is thus provided to combine graph networks topology of the processed data with a neural network to automatically cluster data in a topological way that separates the spurious data patterns from normal data flow. The example implementations also include apparatus comprising the neural networks (or other types of learning machines), the topological graphs, and the neural network filters described herein. The example implementations additionally include non-transitory computer-readable medium having program code recorded thereon for filtering the input streaming data according to the preprocessing parameters and forwarding this data to the filtering neural network and the graph based topological calculator and neural network. The medium may include program code to, when executed by a processor, select at least one moment of an input of the data, along with the execution of the neural networks and graph topological transformers.

The methods and apparatus of the present disclosure include engineered features that are created/generated from the base streaming data. The engineered features measure many aspects of the data instance and may or may not be interesting or germane to human-based analysis. Inputting these features to the neural network modules might or might not supply them with data relationships humans intuitively find interesting. The methods and apparatus include a methodology, device and code to flag specific patterns in data for potential review from a human reviewers (for example, in the case of a financial transaction) if a feature such as comparing the distance between billing and shipping addresses for a transaction is above a certain threshold, the transaction will be automatically flagged for potential review.

In some variations, a method for robust detection and classification of data outliers is provided. The method includes converting a set of data values representative of a multi-dimensional item into a graph representation of the multi-dimensional item, with the graph representation comprising nodes and edges, applying a graph convolution process to the graph representation of the multi-dimensional item to generate a transformed graph representation for the multi-dimensional items comprising a resultant transformed configuration of the nodes and edges representing the multi-dimensional item, and determining, based on the transformed configuration of the nodes and edges representing the multi-dimensional item, a probability that the multi-dimensional item is anomalous.

Embodiments of the method may include at least some of the features described in the present disclosure, including one or more of the following features.

Determining the probability that the multi-dimensional item is anomalous may include processing the transformed configuration of the nodes and edges representing the multi-dimensional item with a global attention module to generate a resultant vector of values, and applying a softmax module to the resultant vector of values to derive the probability that the multi-dimensional item is anomalous.

Converting the set of data values representative of the multi-dimensional item may include transforming values comprising the multi-dimensional items into a plurality of respective multi-dimensional vectors by a plurality of trained multi-layer perceptron applied to the respective values.

The method may further include generating, for the plurality of respective multi-dimensional vectors, a graph representation of nodes with interconnecting edges connecting at least some of the nodes, with positions and orientations of the interconnected nodes in the graph representation relative to each other being indicative of potential anomalous relationships between the set of data values of the multi-dimensional item.

Applying the graph convolution process may include generating, for a particular edge of the edges of the graph representation, an edge composite value based on an edge value representing the particular edge, node values representative of a respective source node and destination node of the particular edge, and a global state value associated with the graph representation, and providing the edge composite value to an edge multi-layer perceptron unit to generate a resultant transformed edge corresponding to the particular edge.

Applying the graph convolution process may include generating, for a particular node of the nodes of the graph representation, a node composite value based on an average of intermediate values, computed using one or more node multi-layer perceptrons, based on a respective one of incoming edge values representing incomings edges directed to the particular node and a value of the particular node.

Applying the graph convolution process comprises may include averaging values of the nodes of the graph representation to generate an average node value generating a global composite value based on the average node value and a global state value associated with the graph representation, and providing the global composite value to a global multi-layer perceptron unit to generate a resultant transformed global state value corresponding to the global state value associated with the graph representation.

Applying the graph convolution process may include applying the graph convolution process using at least one graph neural network system.

The method may further include performing preprocessing on a received raw data record to produce the multi-dimensional item, including performing one or more of, for example, Gaussian normalization applied to the received raw data record, and/or removing one or more data elements of the received raw data record. Such removing may be based on at least one of, for example, entropy associated with the one or more data elements, sparseness associated with the one or more data elements, a p-value associated with the one or more data elements, and/or a low-effect size associated with the one or more data elements.

Removing one or more data elements may include identifying a particular data element as a rare element in response to determining, based on training data to train a learning engine implementation for performing the preprocessing, that the particular data element is present in fewer than an adjustable threshold number of data records comprising the training data, with the adjustable threshold number being adjusted based on likelihood of occurrence of anomalous values for the particular data element, and removing from runtime data records the particular data element identified as the rare element.

Applying the graph convolution process to the graph representation of the multi-dimensional item may include applying a learning-engine implementation of a graph-convolution process.

In some variations, a system is provided that includes an input stage to one or more input data records, and a controller, implementing one or more learning engines, in communication with a memory device to store programmable instructions. The controller is configured to convert a set of data values representative of a multi-dimensional item into a graph representation of the multi-dimensional item, with the graph representation comprising nodes and edges, apply a graph convolution process to the graph representation of the multi-dimensional item to generate a transformed graph representation for the multi-dimensional items comprising a resultant transformed configuration of the nodes and edges representing the multi-dimensional item, and determine, based on the resultant transformed configuration of the nodes and edges representing the multi-dimensional item, a probability that the multi-dimensional item is anomalous.

In some variations, a non-transitory computer readable media is provided, for storing a set of instructions, executable on at least one programmable device, to convert a set of data values representative of a multi-dimensional item into a graph representation of the multi-dimensional item, with the graph representation comprising nodes and edges, apply a graph convolution process to the graph representation of the multi-dimensional item to generate a transformed graph representation for the multi-dimensional items comprising a resultant transformed configuration of the nodes and edges representing the multi-dimensional item, and determine, based on the resultant transformed configuration of the nodes and edges representing the multi-dimensional item, a probability that the multi-dimensional item is anomalous.

Embodiments of the system and the non-transitory computer readable media may include at least some of the features described in the present disclosure, including any one or more of the features described above in relation to the method.

In some variations, another method is provided for detection and classification of data. The method includes receiving input data at a neural network circuit comprising a plurality of node layers, with each of the plurality of node layers comprising respective one or more nodes, and with the neural network circuit further comprising adjustable weighted connections connecting at least some nodes in different layers of the plurality of node layers. The method also includes removing one or more of the weighted connections at one or more time instances.

Embodiments of the other method may include at least some of the features described in the present disclosure, including one or more of the following features.

The neural network circuit may be a feed-forward neural network circuit.

Removing the one or more of the weighted connections may include selecting the one or more of the weighted connections randomly, and removing the randomly selected one or more of the weighted connections.

Removing the one or more of the weighted connections may include selecting a set of multiple connections from the weighted connections based, at least in part, on output of the neural network circuit, and selecting randomly the one or more of the weighted connections from the selected set of multiple connections.

Selecting the set of multiple connections may include selecting one or more pairs of node layers of the neural network circuit according to the output of the neural network circuit, and removing at least one weighted connection between node layers of the selected one or more pairs of node layers.

Selecting the set of multiple connections may include selecting the set of multiple connections according to output values produced by elements of an output node layer of the neural network circuit and a plurality of output ranges defined for possible values produced by the output node layer.

The method may further include configuring at least some of the weighted connections according to a biasing factor in response to output of the neural network resulting from an input data record, of the received input data, processed by the neural network.

The biasing factor may be a multiplication factor applied to the at least some of the weighted connections through a back-propagation operation in response to a determination that the neural network correctly identified the input data record as being anomalous.

The method may further include performing preprocessing on a received raw data record to produce an input data record provided to the neural network circuit, including performing one or more of, for example, Gaussian normalization applied to the raw data record, and/or removing one or more data elements of the raw data record. Such removing may be based on at least one of, for example, entropy associated with the one or more data elements, sparseness associated with the one or more data elements, a p-value associated with the one or more data elements, and/or a low-effect value associated with the one or more data elements.

Removing one or more data elements may include identifying a particular data element as a rare element in response to determining, based on training data to train a learning engine implementation for performing the preprocessing, that the particular data element is present in fewer than an adjustable threshold number of data records comprising the training data, the adjustable threshold number being adjusted based on likelihood of occurrence of anomalous values for the particular data element, and removing from runtime data records the particular data element identified as the rare element.

In some variations, another system is provided that includes an input stage to receive one or more input data records, and a controller, implementing one or more learning engines, in communication with a memory device to store programmable instructions, to receive input data at a neural network circuit comprising a plurality of node layers, with each of the plurality of node layers comprising respective one or more nodes, and with the neural network circuit further comprising adjustable weighted connections connecting at least some nodes in different layers of the plurality of node layers, and remove one or more of the weighted connections at one or more time instances.

In some variations, another non-transitory computer readable media is provided, for storing a set of instructions, executable on at least one programmable device, to receive input data at a neural network circuit comprising a plurality of node layers, with each of the plurality of node layers comprising respective one or more nodes, and with the neural network circuit further comprising adjustable weighted connections connecting at least some nodes in different layers of the plurality of node layers, and remove one or more of the weighted connections at one or more time instances.

Embodiments of the other system, and the other computer readable media may include at least some of the features described in the present disclosure, including at least some of the various features described above in relation to any of the different methods, systems, and media.

Other features and advantages of the invention are apparent from the following description, and from the claims.

BRIEF DESCRIPTION OF THE DRAWINGS

These and other aspects will now be described in detail with reference to the following drawings.

6

Figure 8:
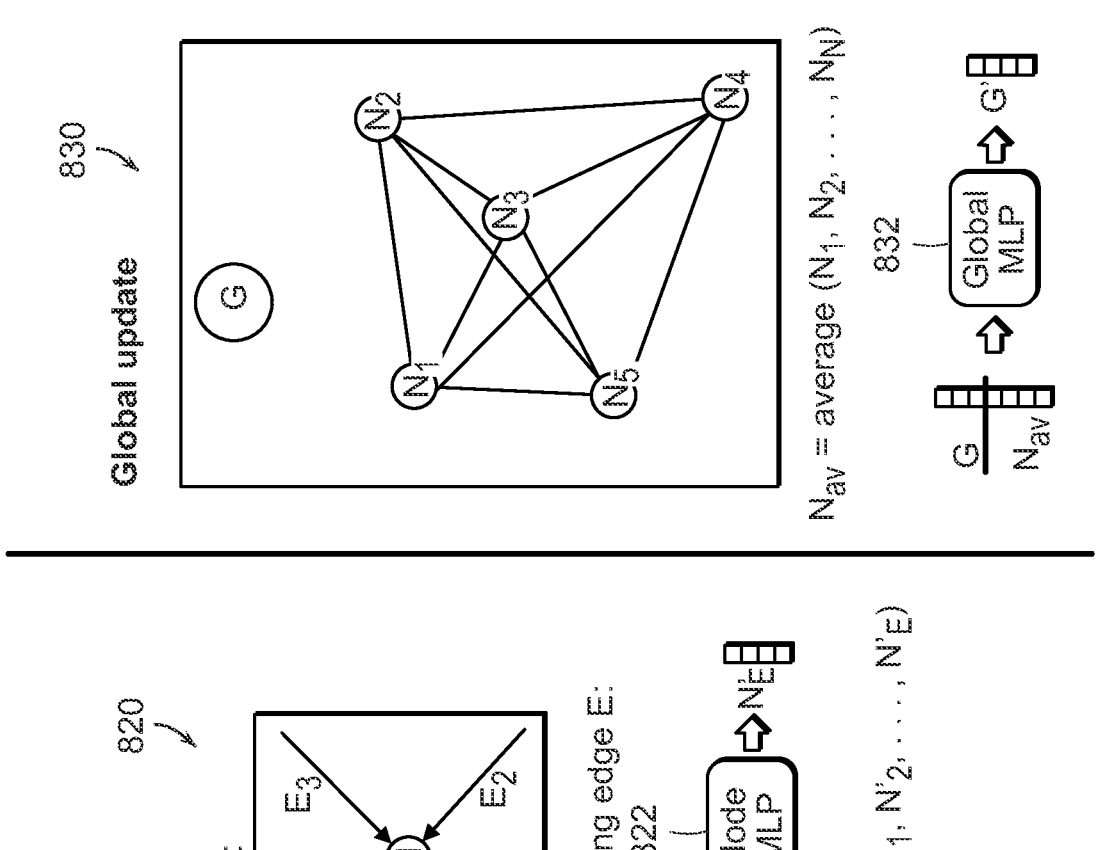

FIG. 8 include diagrams showing iterative updating of edges, nodes and a global state in a graph representation.

FIG. 9 is a flowchart of an example procedure to detect and classify.

Figure 10:
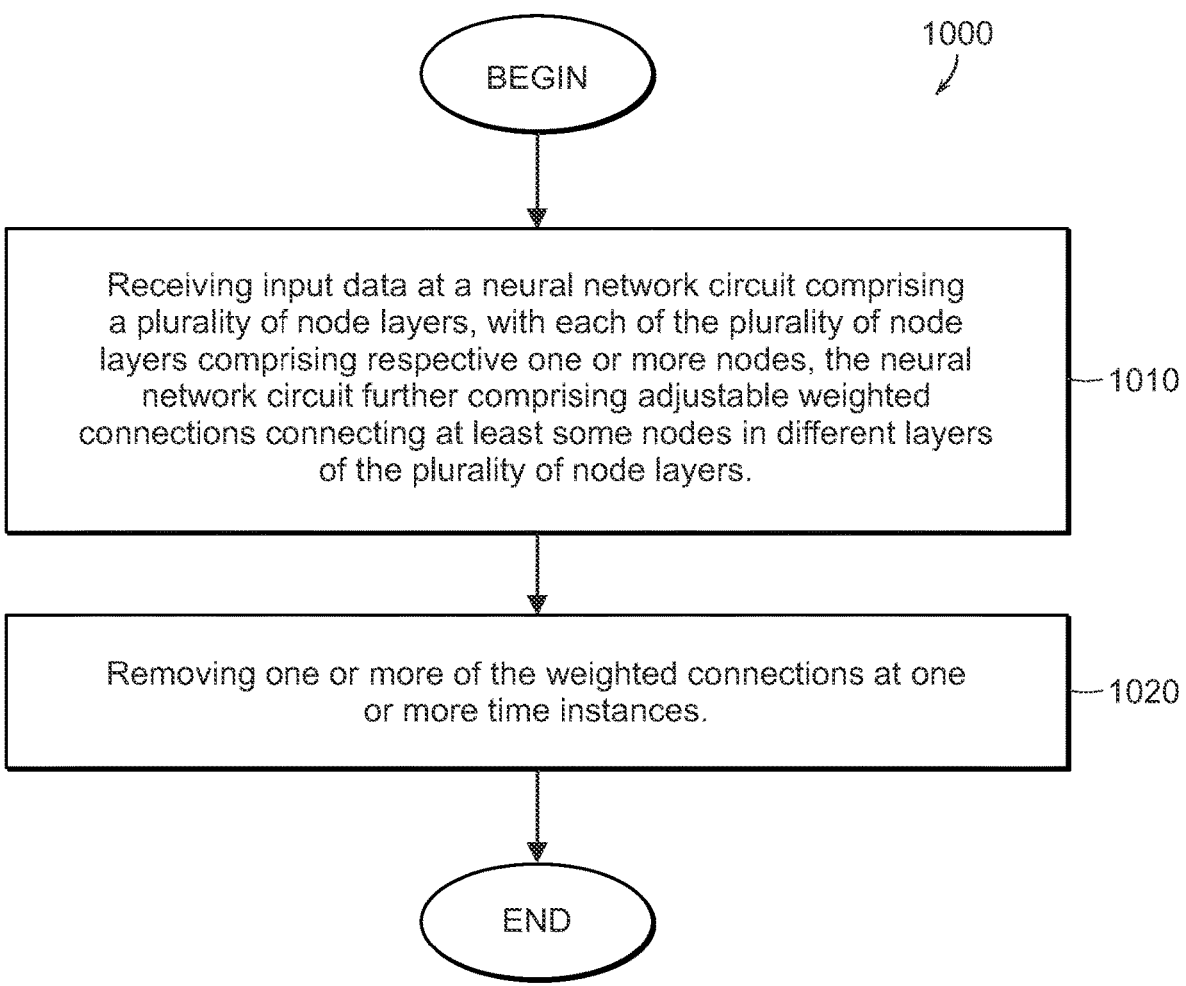

FIG. 10 is a flowchart of an example procedure to detect and classify.

Figure 11:
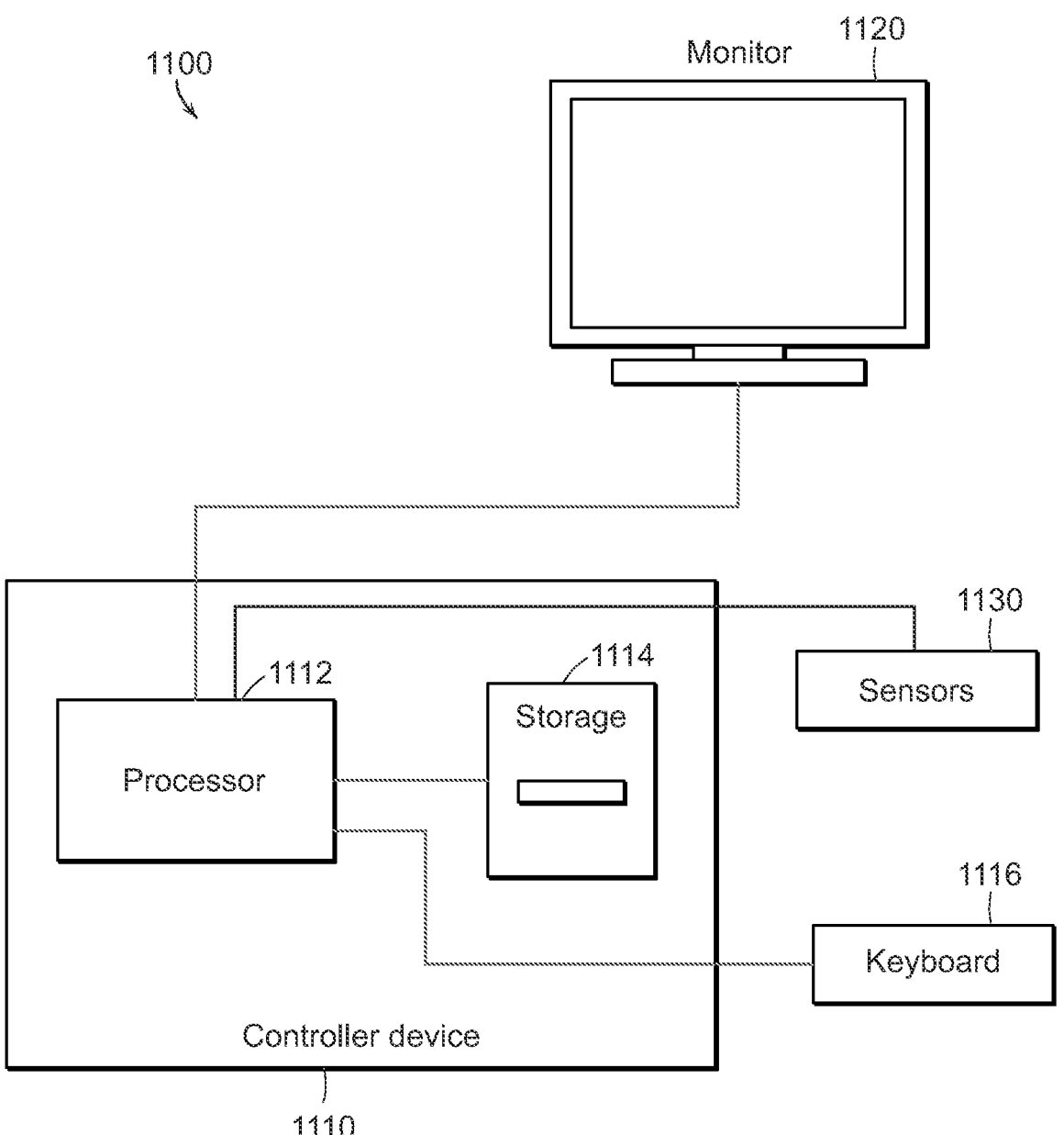

FIG. 11 is a schematic diagram of a computing system.

Like reference symbols in the various drawings indicate like elements.

DESCRIPTION

Described herein are systems, methods, devices, media, and other implementations, including implementations based on learning machines (such as neural networks) to detect anomalous data (e.g., outliers). Two examples implementations are described herein. A first implementation detects anomalous data based on graph representation in which data (after optionally being pre-processed to remove certain features, to normalize the data to be represented as a vector of a pre-determined dimensionality that can be input into a learning machine, etc.) is converted into a graph representation comprising a resultant configuration of nodes connected by weighted edges. A graph neural network (GNN), trained to generate a resultant transformed graph that organized the nodes and edges into a resultant representation (in which the nodes' clustering can be indicative of their relevance or anomality) is applied. The transformed graph representation is then processed by a post-transformation stage to generate an output vector, based on which an output determination (e.g., suspected transaction, or valid transaction) can be made. In a second example implementation, a feed-forward neural network, with an adjustable configuration controlled through a dropout operation (as will be discussed in greater detail below) is provided. In the second example implementation, the input data may be pre-processed (similarly to the pre-processing applied for the input data provided to the first example implementation, with such pre-processing including culling unimportant, redundant, or non-impactful features and values, normalizing the data, etc.) The pre-processed data is then provided to a multi-layer feed forward neural network, for which the various connections interconnecting the network's nodes (elements) can be controllably removed or adjusted (in some examples, based on the determined output of the feed-forward network).

Figure 1:
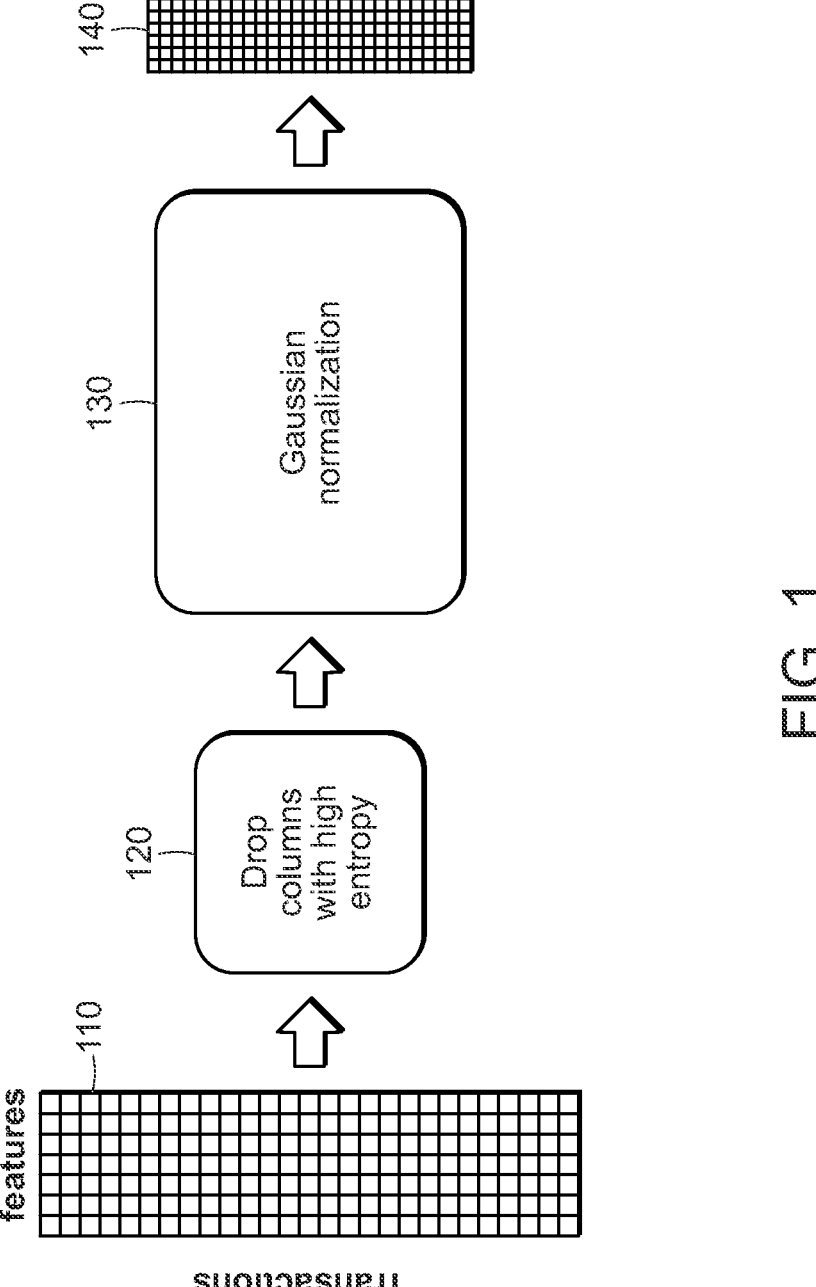
FIG. 1 is a flow diagram illustrating operations/stages to perform data pre-processing for numerical data.

With reference to FIG. 1, a flow diagram 100 illustrating operations/stages to perform data pre-processing for numerical data is shown. The use of preprocessing helps to reduce dimensionality of the data (thus reducing the computation effort required for operating the neural networks of the system, and making the data conform to what the receiving system can handle as input), and to make the neural networks more sensitive to anomalous data (e.g., outliers). As noted, before used as input data to an outlier detection system (e.g., implemented as a neural network), the input data may be optionally preprocessed to facilitate and/or optimize neural network performance. Neural network training data can be used to determine the preprocessing parameters. Numerical features (e.g., certain fields within transaction records) are gaussian normalized according to, for example, the distribution of training data, and dropped altogether if the entropy of that feature exceeds some threshold (as illustrated in FIG. 1). More particularly, and as depicted in FIG. 1, a training set 110 of numerical features is used to determine parameters for gaussian normalization, which are reused when inputting test data to the neural network. First, the entropy of each numerical column is determined, and columns with an entropy above or below a defined threshold are dropped (at block 120 of FIG. 1). Then, input data is gaussian normalized (at block 130) according to the mean and standard deviation of the data column (i.e., the mean and standard deviation generated for a particular feature or field in the records of the training data). The means and standard deviations of each column may be saved on a computer-readable medium, and are used when more data is input to the model (140).

To force a reduction in the dimensionality of the input data, categorical features are dropped if in the training set the feature is too sparse, the p-value is too high (the p-value is a measure of the probability that an observed difference could have occurred by random chance, with a low p-value being indicative of meaningful statistical significance of such an observed difference), or the effect size is too low. Training data can thus be processed to identify and drop sparse columns (e.g., corresponding to data fields that might not provide meaningful training input). Low frequency categories (fields in the records of the remaining data) may be classified as rare if their frequency is below a threshold frequency. Threshold frequency for rare classification may be lowered depending on the fraud likelihood of the category, or if the feature has a set number of categories or unrestricted number of categories. Subsequent to the rare encoding, columns with high p-values or low effect size can be removed/discarded. In some embodiments, when the processed training data is provided to train a feed-forward network, columns or fields of data records the corresponding to categories (e.g., descriptive data from a finite set of values or descriptions, such as a month field, purchase type field, etc.) are replaced with, for example, one-hot columns for each column category (in one-hot encoding, a vector representation may include, for example, one element that is '1' with other elements of the vector being '0'). When the resultant data at is to be used to train a graph neural network, category data represented as alpha-numerical strings may be replaced with integer indices.

Figure 2:
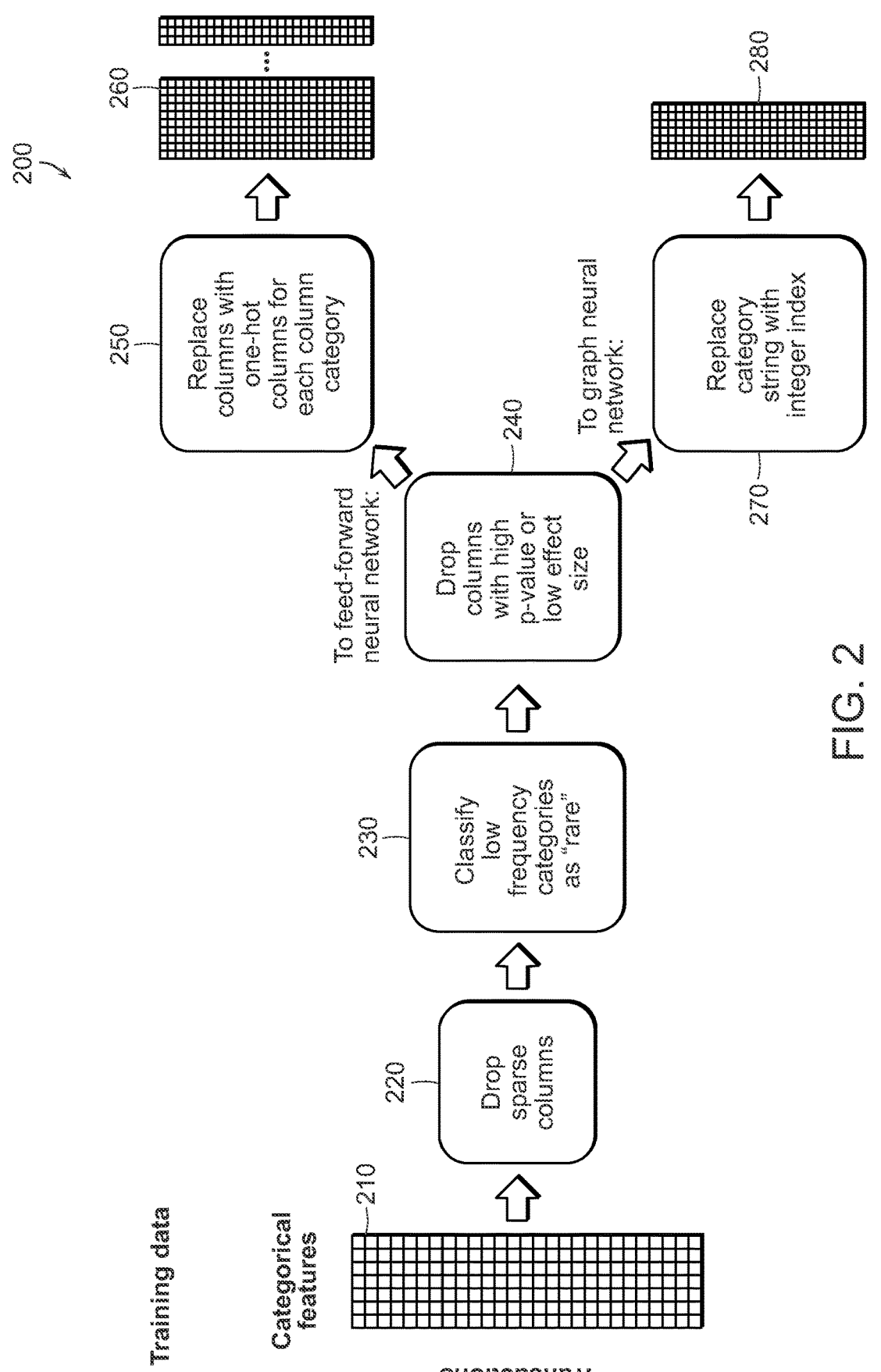
FIG. 2 is a flow diagram showing preprocessing operations for categorical data.

FIG. 2 is a flow diagram 200 showing preprocessing operations for categorical data (e.g., descriptive data rather than numerical data). The training set of categorical features (210) is used to determine which features to use, which categories to use, and which categories to classify as "rare." First, columns below a certain sparsity level are dropped (at block 220). Next, categories for each column are classified as "rare" if the category occurs some number of times below a "rare" threshold (as determined at block 230). An exception to this rule is if the category is below the cutoff, but is still one of the top three (3), or some other number of categories, most frequent categories. Next, the p-value and Cramer's Corrected Statistic, or "effect size," are calculated for each categorical column. Columns with a p-value above a threshold, and columns below an effect size threshold, are dropped/discarded (at block 240). Next the categorical columns are encoded for input to the neural network modules. For the feed-forward neural network, categorical features are one-hot encoded, such that each categorical entry may be replaced by a number of columns equal to the number of categories for that categorical column (at blocks 250 and 260). For the graph neural network, the number of columns stays the same, but categorical strings in each column are replaced by an integer label (at blocks 270 and 280).

Figure 3:
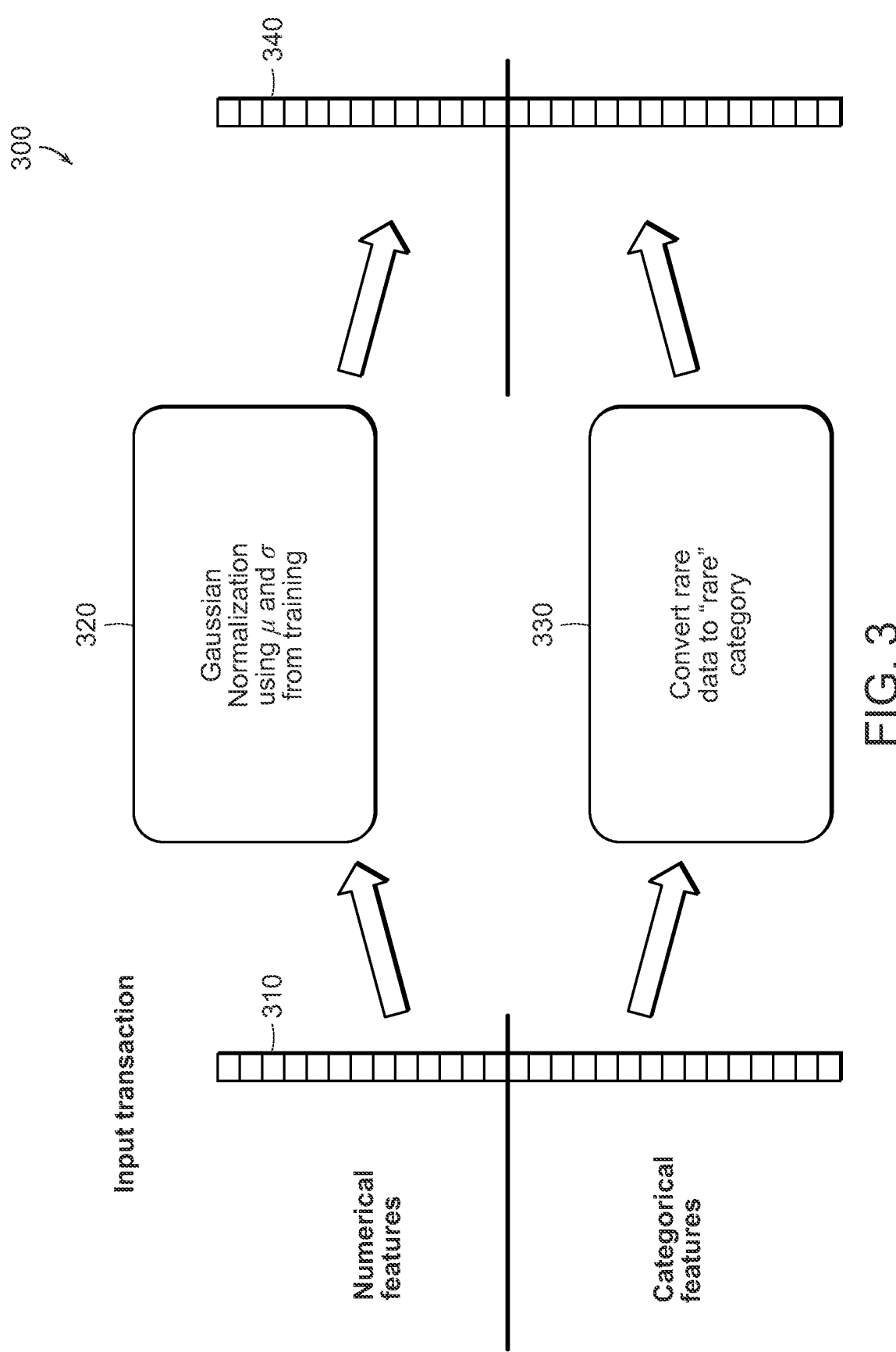
FIG. 3 is a flow diagram illustrating an example data preprocessing procedure for input data (e.g., post-training data).

With reference to FIG. 3, a flow diagram 300 illustrating an example data preprocessing procedure for input data (e.g., post-training data) is shown. A data record 310 (depicted as a column with entries corresponding to fields or features) includes numerical features and categorical features (i.e., populated by descriptive categories from a finite dictionary or set of values). Input numerical features are gaussian-normalized (at block 320) according to the distribution determined by the training data. Thus, numerical values may by normalized (e.g., based on a Gaussian normalization process) according to mean and standard deviation values (and a) that may have been determined during training phase. In some examples, categorical features (e.g., descriptive features populated based on a finite dictionary of values/terms) of the input data (310) are translated (at block 330) to "rare" if either the category was "rare" during training, or if the category was not seen in the training data. Categorical features which saw no "rare" categories during training (e.g., all categories for this column in training data were present with high frequency), but are input with a category not present in the training set, will ignore the new category input and instead use no information for this column. Following the pre-processing performed on the input data record 310 (according to operations 320 and 330), a resultant transaction record 340 is generated.

Figure 4:
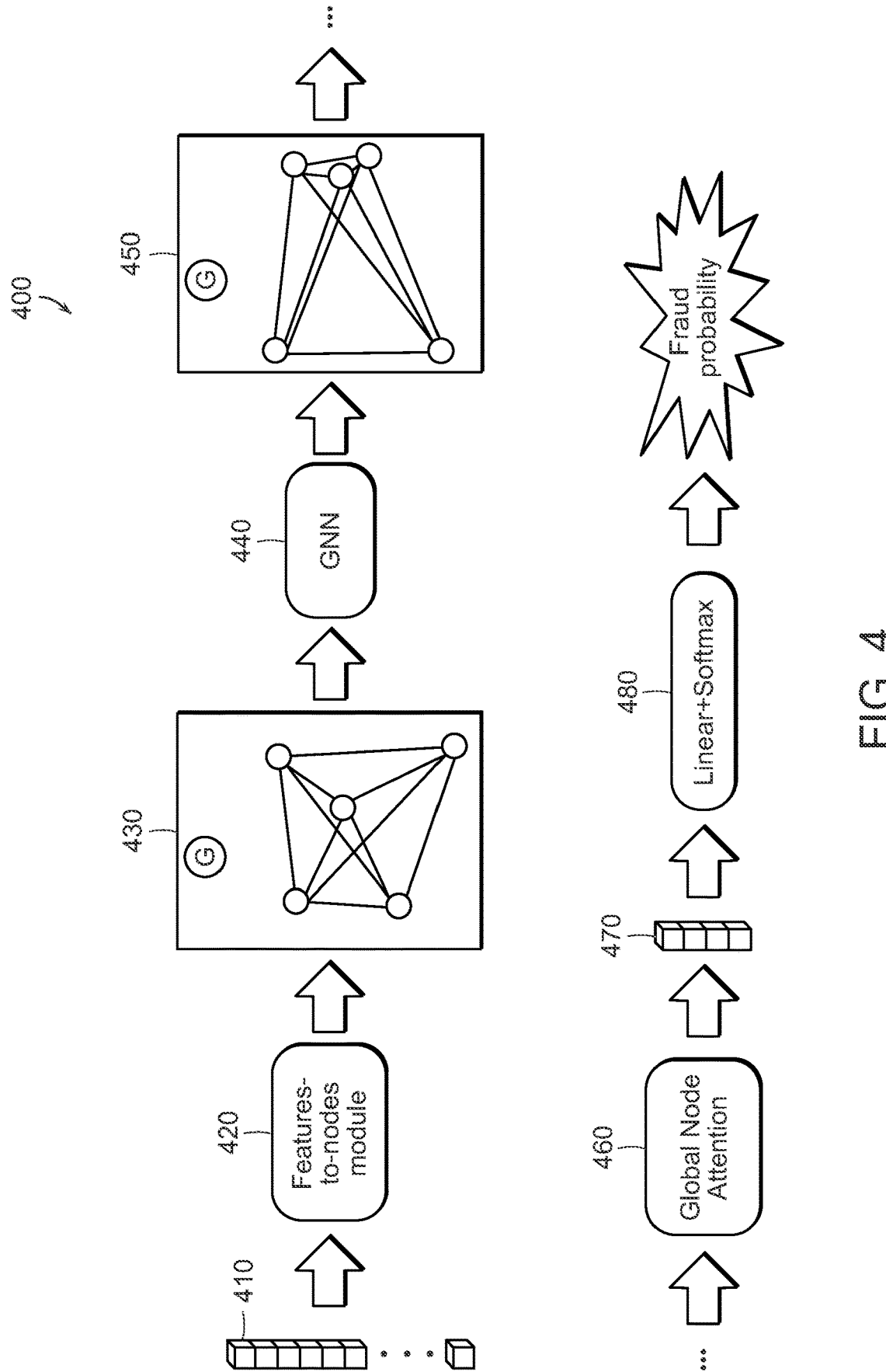
FIG. 4 is a flow diagram showing a procedure to identify anomalous data using graph neural networks.

As noted, one example learning-based processing applied to preprocessed data is based on graph neural networks. FIG. 4 is a flow diagram 400 showing a procedure to identify anomalous data using graph neural networks. A graph neural network module (as depicted in FIG. 4) of the present disclosure turns the input data 410 (which may correspond to the resultant transaction record 340 of FIG. 3) into a graph representation, then outputs (at the "Linear+Softmax" module 480) the probability that the record is anomalous (e.g., whether a transaction, represented by the record, is fraudulent or legitimate). Each of the individual data features of the transaction data is translated into a high-dimensional graph node representation using, for example, a features-to-nodes module 420.

Figure 6:
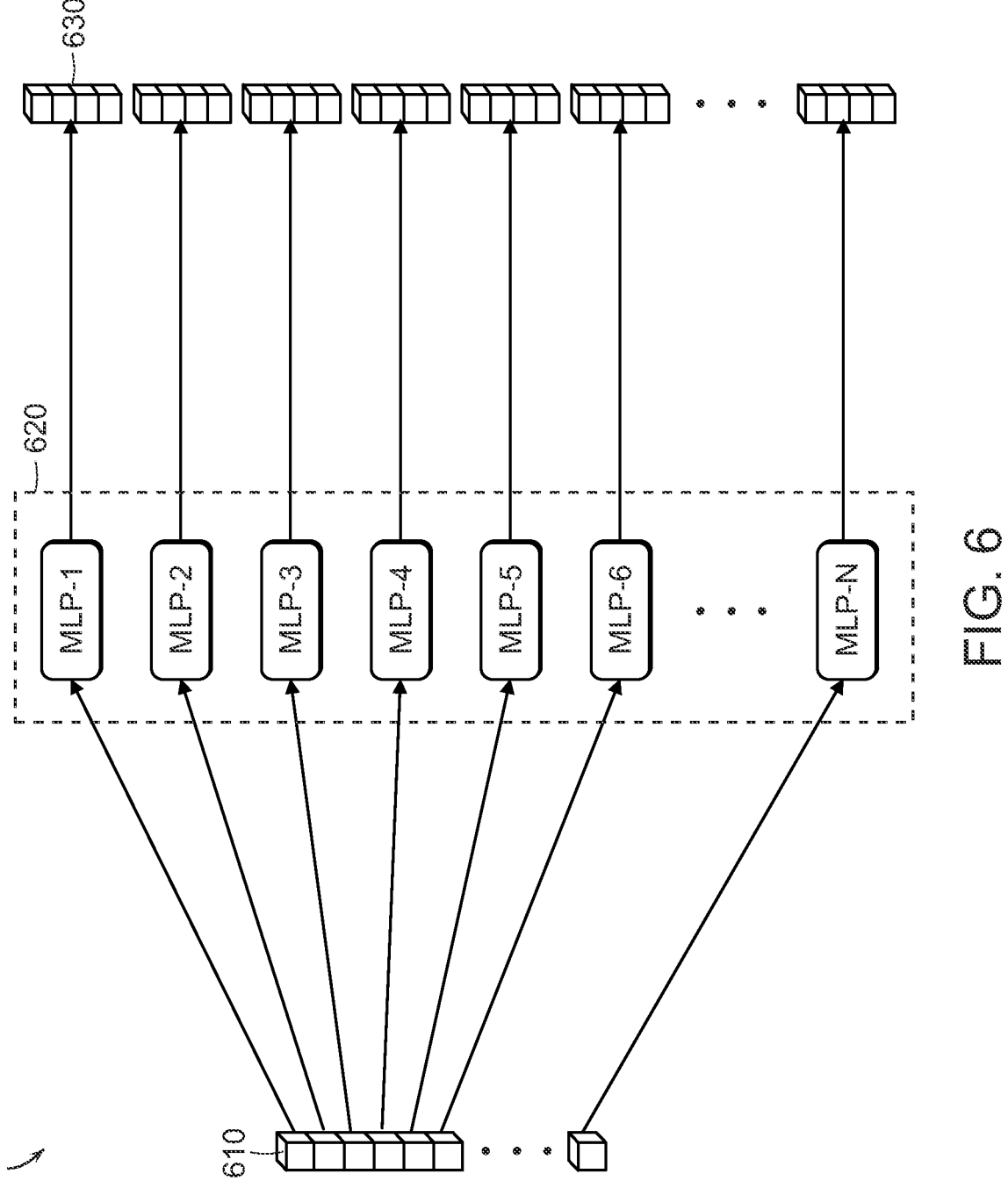
FIG. 6 is a diagram of a features-to-nodes module to converts vector data into graph representation data.

FIG. 6 is a diagram showing an example implementation of a features-to-nodes module (such as the module 420) which turns/converts vector data (representative of a data record, such as a transaction record) into a graph representation for input into the graph neural network module. Each individual feature included in the input transaction data (depicted as record 610) can be mapped from 1-dimensional space to a high dimensional space (e.g., d>16) by a multilayer perceptron (MLP) arrangement (depicted as the structure 620 in FIG. 6). In some embodiments, the MLP arrangement may be implemented as an artificial neural network (ANN), such a feedforward ANN, but other types of neural networks (as discussed herein), and/or other types of learning machines, may be used to implement the MLP arrangement of FIG. 6 or the other MLP arrangements discussed herein (e.g., with respect to FIG. 8, as more particularly detailed below). In some embodiments, a separate MLP is trained for each individual input feature. The output of an individual MLP is a resultant multi-dimensional vector (such as vector 630 in FIG. 6) that can be represented node within a graph representation of the input data record. In some examples, the resultant output vectors, representing nodes, provide not only data representative of the feature information (that was input into respective MLP's) but also their positional/orientational relationship, in the graph representation, to other resultant nodes in the graph representation. Such graphical representation of data can be used to determine if there are abnormal relationships between various nodes in a graph representation (e.g., if the orientation between, for example, a group of several (e.g., 3) particular nodes is such that the angles between straight lines passing between is unusually large). The nodes of the node-based graphical representation of the input data records are made into a fully connected graph, using a learned initial edge representation. The interconnected edge elements in the resultant graph representation of the node representations for the output of the MLP structures may share an initial weight vector, which is determined by the neural network training process.

With continued reference to FIG. 4, the graph representation to the GNN module (440), which may be implemented using a neural network or some other learning machine, transforms the initial graphical representation 430 of the input data record into a transformed graph representation resulting from the learned behavior/configuration of the GNN to identify anomalous data. For example, the transformed graph (represented as a graph 450 in FIG. 4) may have been transformed (by updating the edge and node representations of the graph) so that important nodes are clustered into a configuration that can be indicative of the existence or lack of anomalous behavior. The resultant graph representation 450 is input to a global attention layer 460, which outputs a vector representation 470 of the graph. The global node attention operation can thus generate a composite vector representation based on the individual nodes. For example, nodes of the graph representation 450 are input to the global attention module 460, providing a node weight for each node. The node representations are multiplied by their weights, and averaged. The global node attention operation can be represented according to $$V_{output}(v_1, v_2, \ldots, v_d) =$$

$$\frac{w_a(a_1, a_2, \ldots, a_d) + w_b(b_1, b_2, \ldots, b_d) + w_n(n_1, n_2, \ldots, n_d)}{n},$$

where $V_{output}$ is the output vector 470, each of a, b, . . . , n is one of the individual nodes of the transformed graph representation 450, and $w_a, \ldots w_n$ are the respective weights applied to the d-dimensional vector representation of the nodes. Other global node attention operations (to generate a composite vector from the graph representation) may be used.

The final weighted, averaged node representation may next be operated on by a module 480 that transforms a single linear layer to, for example, 2-dimensions, which is then input to a softmax layer to produce class probabilities, quantifying the probability of the data as being anomalous (e.g., the transaction is erroneous/fraudulent) or as being within normal data patterns (e.g., the transaction is not suspected to be abnormal/suspicious). Other filtering or processing operations may be applied to the composite vector representation 470.

Figure 7:
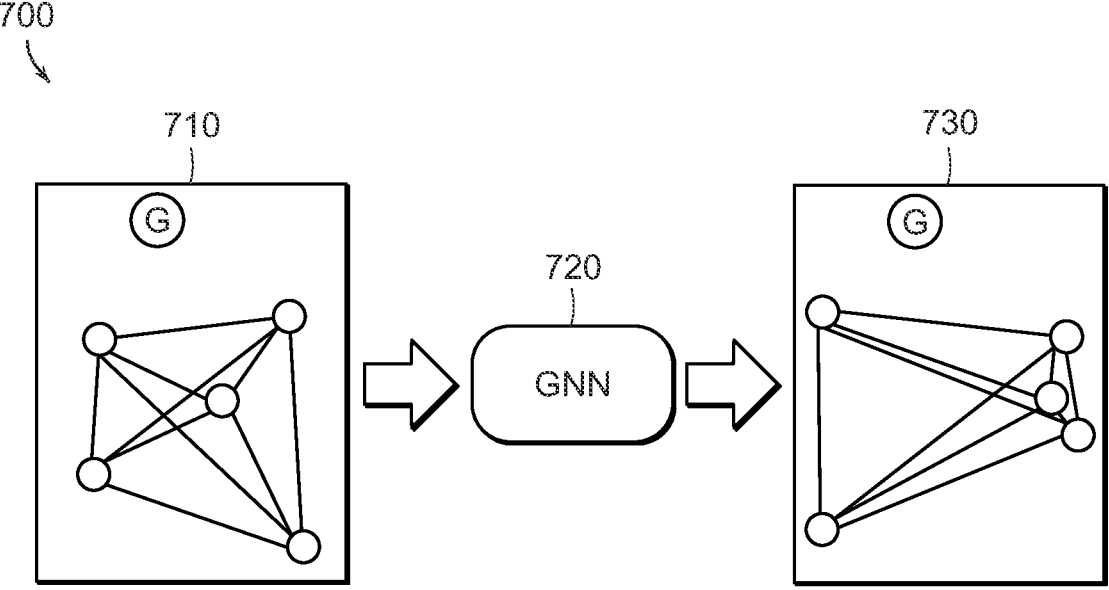
FIG. 7 is a diagram illustrating transformation of an initial graph representation into a resultant transformed representation.

Further details of the graph neural network module are provided in FIG. 7, comprising a diagram 700 illustrating the transformation of an initial graph representation (e.g., generated by the array of MLP structures 620 depicted in FIG. 6). The Graph Neural Network module 720 takes as input a graph 710 (where each node and edge may be represented by a vector), and outputs a graph 730 with updated values for each node and edge.

An example process for calculating output graph node and edge representations is detailed herein. The graph neural network module functions by iteratively updating representations of the edges, then nodes, then global state of the graph. This process is illustrated by FIG. 8 providing diagrams depicting the various operations performed by the graph neural network modules (such as the GNN module

720 depicted in FIG. 7). The process of updating graph state is referred to as "message-passing" or "graph convolution." In the implementations described herein, message-passing is implemented as follows. First edges are updated as shown in diagram 810. For each edge, the edge representation, source node representation, destination node representation, and global representation are consolidated (e.g., concatenated) into a single vector. This vector is used as input to an edge-MLP (such as edge MLP 812 depicted in FIG. 8), which outputs a new edge representation of the same length as the original edge representation. Second, node representations are updated as shown in diagram 820. For each node, a new representation is created for each of that node's incoming edges. The final node representation used is the average of each of these representations. The node representation for each incoming edge is created by, for example, concatenating the original node representation with the incoming edge representation, and using that as input to a node-MLP (such as node-MLP 822 depicted in FIG. 8), which outputs a new node representation. Finally, the graph global state is updated as shown in diagram 830. In an example embodiment, first, the node representations for all nodes are averaged. Then, the global state vector is concatenated with the average node vector, and used as input to a global-MLP (such as global-MLP 832 depicted in FIG. 8), which outputs a new global state representation.

With reference to FIG. 9, a flowchart of an example procedure 900 to detect and classify data (e.g., identifying data with anomalous behavior) is shown. The procedure 900 includes converting 910 a set of data values representative of a multi-dimensional item into a graph representation of the multi-dimensional item, with the graph representation comprising nodes and edges. In some examples, converting the set of data values representative of the multi-dimensional item may include transforming values comprising the multi-dimensional items into a plurality of respective multi-dimensional vectors by a plurality of trained multi-layer perceptron applied to the respective values. In such examples, the procedures may also include generating, for the plurality of respective multi-dimensional vectors, a graph representation of nodes with interconnecting edges connecting at least some of the nodes, with positions and orientations of the interconnected nodes in the graph representation relative to each other being indicative of potential anomalous relationships between the set of data values of the multi-dimensional item. For example, unusually skewed orientations can be indicative of abnormal (anomalous) relationships between different features of a multi-dimensional data item, which can indicate some oddity or inconsistency in the relationship between the features (which, in turn, can suggest an increased likelihood of unnatural or fraudulent behavior).

The procedure 900 further includes applying 920 a graph convolution process to the graph representation of the multi-dimensional item to generate a transformed graph representation for the multi-dimensional item comprising a resultant transformed configuration of the nodes and edges representing the multi-dimensional item. In some examples, applying the graph convolution process may include generating, for a particular edge of the edges of the graph representation, an edge composite value based on an edge value representing the particular edge, node values representative of a respective source node and destination node of the particular edge, and a global state value associated with the graph representation, and providing the edge composite value to an edge multi-layer perceptron unit to generate a resultant transformed edge corresponding to the particular edge. In another example, applying the graph convolution process may include generating, for a particular node of the nodes of the graph representation, a node composite value based on an average of intermediate values, computed using one or more node multi-layer perceptrons, based on a respective one of incoming edge values representing incomings edges directed to the particular node and a value of the particular node. In yet another example, applying the graph convolution process may include averaging values of the nodes of the graph representation to generate an average node value, generating a global composite value based on the average node value and a global state value associated with the graph representation, and providing the global composite value to an global multi-layer perceptron unit to generate a resultant transformed global state value corresponding to the global state value associated with the graph representation. In some embodiments, the various operations performed with respect to the edge transformation, the node transformation, and the global state value transformation may be performed together or independently of each operation. In some examples, applying the graph convolution process may include applying the graph convolution process using at least one graph neural network system.

With continued reference to FIG. 9, the procedure 900 additionally includes determining 930, based on the transformed configuration of the nodes and edges representing the multi-dimensional item, a probability that the multi-dimensional item is anomalous. Determining the probability that the multi-dimensional item is anomalous may include processing the transformed configuration of the nodes and edges representing the multi-dimensional item with a global attention module to generate a resultant vector of values, and applying a softmax module to the resultant vector of values to derive the probability that the multi-dimensional item is anomalous.

In some embodiments, the procedure 900 further includes performing preprocessing on a received raw data record to produce the multi-dimensional item, including performing one or more of, for example, Gaussian normalization applied to the received raw data record, and/or removing one or more data elements of the received raw data record based at least one of, for example, entropy associated with the one or more data elements, sparseness associated with the one or more data elements, a p-value associated with the one or more data elements, and/or a low-effect value associated with the one or more data elements. In some embodiments, removing the one or more data elements may include identifying a particular data element as a rare element in response to determining, based on training data to train a learning engine implementation for performing the preprocessing, that the particular data element is present in fewer than an adjustable threshold number of data records comprising the training data, with the adjustable threshold number based adjusted based on likelihood of occurrence of anomalous values for the particular data element. For example, for a data element that is determine to include, at a higher relative frequency, anomalous values, its associated threshold may be increased so that the data element is not removed from a data records, and may thus be captured by the anomalous data detection engine. The procedure may also include removing from runtime data records the particular data element identified as the rare element.

Figure 5:
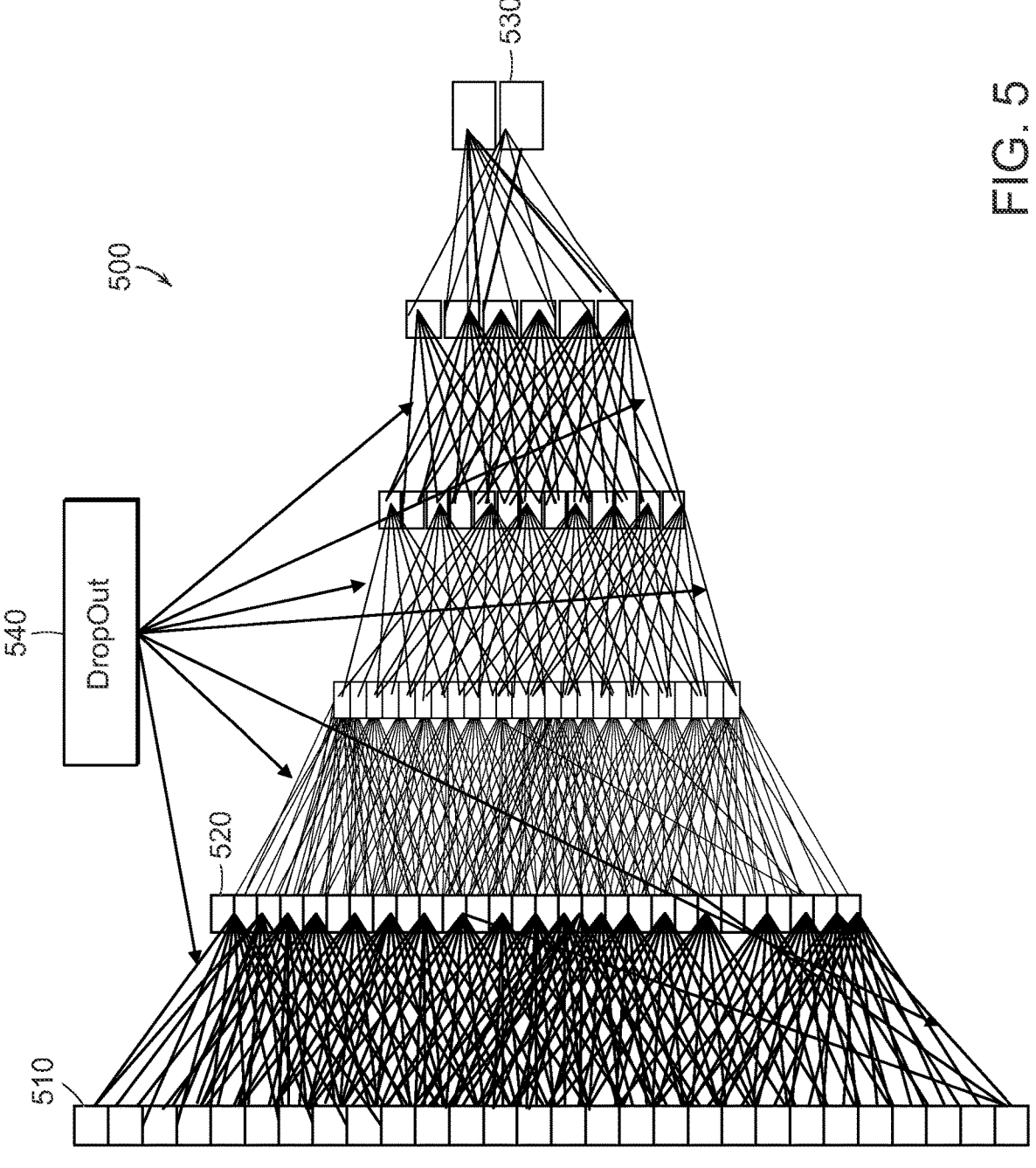
FIG. 5 is a diagram of a topology of an example detector neural network.

As noted, another example implementation for detecting anomalous behavior (e.g., the existence of outliers) is based on a feed-forward neural network. FIG. 5 is a diagram of an example implementation of a feed-forward neural network 500, configured to increase sensitivity of the neural network to the presence of outliers in the input data. A feed forward neural network module converts a set of transaction information into a numerical array and outputs the probability that the data input is normal or spurious. The input information can be both numerical data (for example in a financial transaction use case, the numerical data can include payment total or days since the last order) or categorical data (for example, payment method or country of origin). The model includes of a series of vectors (layers), where each node in a layer may be connected to some or all the nodes in the previous and subsequent layers. An input layer 510 is (or receives) the array created from the numerical and categorical variables. The values in the input layer are multiplied by the weight values in the connections to create the array for a first hidden layer 520 of one or more hidden layers (FIG. 5 shows multiple hidden layers). This process of multiplying each layer by the connection weights to the next layer is repeated until a last layer 530 (in the example of FIG. 5, the last layer 530 includes 2 nodes). The values in the nodes of the last layer represent the probability the model predicts for the specific transaction to be erroneous. As further depicted in FIG. 5, a dropout module 540 is connected to the neural network, and is configured to cut or remove one or more of the connections between nodes of different layers. In some embodiments, the dropout may randomly cut connections between one or more or the layers, and may do so either at random instances, or in response to a certain event (e.g., the determination, at the output stage layer of the network, that the generated probability of the existence of an anomalous events exceeds a threshold). Instead of a probability exceeding a threshold, the trigger event may be a determination, at the output, of the existence of an anomalous event (e.g., according to a yes/no determination with respect to existence of an outlier or some aspect of the data rendering the data anomalous). In some examples, the dropout module 540 may be configured to select the connection of the neural network at least partly based on deterministic criteria. For example, selection of the layers from which connections are to be (randomly) removed may be based, in part, on the output value produced by the network (e.g., selecting a connection between the first and second layer if the output is in some output range). The specific connection to be removed between the selected layer may then be picked randomly (or, at least partly, deterministically). The use of the dropout module 540 facilitates controlled structuring of the interconnections of the neural network in a way that increases sensitivity of the network to outlier data.

In some embodiments, increasing sensitivity of the neural network 500 to anomalous data (such as outlier data) may be achieved by applying a bias to weights of the neural network connections in response to, for example, a correct identification of a classification category (e.g., outlier/normal classification). Thus, for example, if during training the neural network produces a correct output in response to an input data record (e.g., correctly identifying, as defined in the ground truths for the training data, a particular record as corresponding to an outlier), a bias value (e.g., a multiplication factor to increase the strength of at least some of the connections' weight) is applied. The application of biasing can be performed through the use of a biasing factor to modify the weights of each output class through a weight (float) value, used for weighting the loss function during training based on a certain bias factor. This biasing scheme allows the sensitivity of the neural network to anomalous data (upon a correct identification of an input data record as being anomalous) to increase. It has been observed that use of a biasing procedure is more effective (i.e., to increase sensitivity of the network) when used in conjunction with the dropout module 540.

Thus, with reference to FIG. 10, a flowchart of an example procedure 1000 to detect and classify data (e.g., as anomalous or as being an outlier, etc.) is shown. The procedure 1000 may be used in conjunction with other anomalous data detection procedures (such as the procedure 900 depicted in FIG. 9). The procedure 1000 includes receiving 1010 input data at a neural network circuit comprising a plurality of node layers, with each of the plurality of node layers comprising respective one or more nodes, with the neural network circuit further comprising adjustable weighted connections connecting at least some nodes in different layers of the plurality of node layers. In some examples, the neural network circuit may be a feed-forward neural network circuit.

The procedure 1000 further includes removing 1020 one or more of the weighted connections at one or more time instances. In some examples, removing the one or more of the weighted connections may include selecting the one or more of the weighted connections randomly, and removing the randomly selected one or more of the weighted connections. In some embodiments, part of the connection-selection process may be deterministic. For example, the layers between which one of the connections is to be removed may be selected based on output of the neural network circuit. In such examples, removing the one or more of the weighted connections may include selecting a set of multiple connections from the weighted connections based, at least in part, on output of the neural network circuit, and selecting randomly the one or more of the weighted connections from the selected set of multiple connections. In some embodiments, selecting the set of multiple connections may include selecting one or more pairs of node layers of the neural network circuit according to the output of the neural network circuit, and removing at least one weighted connection between node layers of the selected one or more pairs of node layers. Selecting the set of multiple connections may include selecting the set of multiple connections according to output values produced by elements of an output node layer of the neural network circuit and a plurality of output ranges defined for possible values produced by the output node layer.

In some embodiments, the procedure 1000 may further include configuring at least some of the weighted connections according to a biasing factor in response to output of the neural network resulting from an input data record, of the received input data, processed by the neural network. In such embodiments, the biasing factor is a multiplication factor applied to the output of the feed forward neural network in response to a determination that the neural network correctly identified the input data record as being anomalous.

In some implementations, the procedure 1000 may further include performing preprocessing on a received raw data record to produce an input data record provided to the neural network circuit, including performing one or more of, for example, Gaussian normalization applied to the raw data record, and/or removing one or more data elements of the raw data record based on at least one of, for example, entropy associated with the one or more data elements, sparseness associated with the one or more data elements, a p-value associated with the one or more data elements, and/or a low-effect value associated with the one or more data elements. In some examples, removing one or more data elements may include identifying a particular data element as a rare element in response to determining, based on training data to train a learning engine implementation for performing the preprocessing, that the particular data element is present in fewer than an adjustable threshold number of data records comprising the training data, with the adjustable threshold number being adjusted based on likelihood of occurrence of anomalous values for the particular data element, and removing from runtime data records the particular data element identified as the rare element.

As noted, implementation of the anomalous behavior detection systems and methods described herein may be realized using one or more learning machines such as neural networks. Neural networks are in general composed of multiple layers of linear transformations (multiplications by a "weight" matrix), each followed by a nonlinear function (e.g., a rectified linear activation function, or ReLU, etc.) The linear transformations are learned during training by making small changes to the weight matrices that progressively make the transformations more helpful to the final classification task. A multilayer network is adapted to analyze data (such as transaction data for normal and suspicious transactions, or other types of data), taking into account the dimensionality or resolution of the data (e.g., a preprocessing stage may be applied to the data to normalize and/or cull some of the fields). The layered network may include convolutional processes which are followed by pooling processes along with intermediate connections between the layers to enhance the sharing of information between the layers. Several examples of learning engine approaches/ architectures that may be used include generating an autoencoder and using a dense layer of the network to correlate with probability for a future event through a support vector machine, or constructing a regression or classification neural network model that predicts a specific output from data records (based on training reflective of correlation between similar records and the output that is to predicted).

Examples of neural networks include convolutional neural network (CNN), feed-forward neural networks, recurrent neural networks (RNN, e.g., implemented, for example, using long short-term memory (LSTM) structures), etc. Feed-forward networks include one or more layers of perceptrons (the learning nodes/elements) with connections to one or more portions of the input data. In a feedforward network, the connectivity of the inputs and layers of perceptrons is such that input data and intermediate data propagate in a forward direction towards the network's output. There are typically no feedback loops or cycles in the configuration/structure of the feed-forward network. Convolutional layers allow a network to efficiently learn features by applying the same learned transformation to subsections of the data. In some embodiments, the various learning processes implemented through use of the learning machines may be realized using keras (an open-source neural network library) building blocks and/or NumPy (an open-source programming library useful for realizing modules to process arrays) building blocks.

In some embodiments, the various learning engine implementations may include a trained learning engine (e.g., a neural network) and a corresponding coupled learning engine controller/adapter configured to determine and/or adapt the parameters (e.g., neural network weights) of the learning engine that would produce output representative of determined anomalous data (e.g., corresponding to potential fraudulent transactions). In such implementations, training data includes sets of input records (similar to the types of transaction input data that would be provided as input during runtime operations of the learning engines constituting the anomalous data detection systems described herein) along with corresponding data defining the ground truth for the input training data. After initial training of the various learning engines comprising the systems described herein, subsequent training may be intermittently performed (at regular or irregular periods). For example, upon the acquisition of new data corresponding to different population groups or geographical regions that may be associated with different transaction behaviors or characteristics (e.g., for systems configured to detect anomalous transactions), the learning engine adapters/controllers may perform additional training cycles to configure the learning engines to generate appropriate output consistent with the old types of data that the learning engines had previously been adapted for, and also consistent with the new types of data (e.g., corresponding to the new population groups or geographical regions). Upon completion of a training cycles by the adapter/controller coupled to a particular learning engine, the adapter provides data representative of updates/changes (e.g., in the form of parameter values/weights to be assigned to links of a neural-network-based learning engine) to the particular learning engine to cause the learning engine to be updated in accordance with the training cycle(s) completed.

Performing the various operations described herein may be facilitated by a controller system (e.g., a processor-based controller system). Particularly, at least some of the various devices/systems described herein, including any neural network systems, may be implemented, at least in part, using one or more processor-based devices.

Thus, with reference to FIG. 11, a schematic diagram of a computing system 1100 is shown. The computing system 1100 includes a processor-based device (also referred to as a controller device) 1110 such as a personal computer, a server, a specialized computing device, and so forth, that typically includes a central processor unit 1112, or some other type of controller (or a plurality of such processor/controller units). In addition to the CPU 1112, the system includes main memory, cache memory and bus interface circuits (not shown in FIG. 11). The processor-based device 1110 may include a mass storage element 1114, such as a hard drive (realize as magnetic discs, solid state (semiconductor) memory devices), flash drive associated with the computer system, etc. The computing system 1100 may further include a keyboard 1116, or keypad, or some other user input interface, and a monitor 1120, e.g., an LCD (liquid crystal display) monitor, that may be placed where a user can access them. The computing system 1100 may also include one or more sensors 1130 (e.g., an image-capture device, inertial sensors, environmental sensors, etc.) to obtain data to be analyzed.

The processor-based device 1110 is configured to facilitate, for example, the implementation of detection of anomalous behavior in data (e.g., detection of fraudulent activity in financial transaction data), through implementation (using the computing system 1100) of trained learning machines, and according to the procedures and operations described herein. The storage device 1114 may thus include a computer program product that when executed on the processor-based device 1110 causes the processor-based device to perform operations to facilitate the implementation of procedures and operations described herein. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver(s)), for downloading related content to the connected system. Such peripheral devices may also be used for downloading software containing computer instructions to enable general operation of the respective system/device. Alternatively or additionally, in some embodiments, the computing system 1100 may include one or more graphics processing units (GPU's, such as NVIDIA GPU's), and may also include special purpose logic circuitry, e.g., an FPGA (field programmable gate array), an ASIC (application-specific integrated circuit), a DSP processor, accelerated processing units (APU's), application processing units, etc., may be used in the implementation of the system 1100 in order to implement the learning engine including the neural networks. Other modules that may be included with the processor-based device 1110 are speakers, a sound card, a pointing device, e.g., a mouse or a trackball, by which the user can provide input to the computing system 1100. The processor-based device 1110 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory), electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for detection and classification of data, the method comprising:

transforming by a plurality of multi-layer perceptrons (MLP's) each 1-dimensional data value of a multi-field record into a respective multi-dimensional vector of a plurality of multi-dimensional vectors, with each data value of each field from the multi-field record being transformed by a respective different MLP, from the plurality of MLP's, that was separately trained to transform the respective field from the multi-field record;

converting the plurality of respective multi-dimensional vectors into a first graph representation comprising nodes and edges, wherein each of the plurality of the respective multi-dimensional vectors corresponds to a respective one of the nodes in the first graph representation, with the respective one of the nodes including value information representing feature information for the respective data value and positional information representing a relationship of the respective one of the nodes to other of the nodes in the first graph representation;

transforming by a machine learning graph convolution system the first graph representation to a second, transformed, graph representation for the multi-field record, the second graph representation comprising a transformed configuration of transformed nodes and edges in the second graph representation in which the transformed nodes and edges are organized into a clustering configuration indicative of anomaly of the nodes and edges of the first graph representation and of the multi-field record, wherein the machine learning graph convolution system comprises at least one edge MLP trained to transform each edge of the first graph representation into a transformed edge, at least one node MLP to transform each node of the first graph representation to a transformed node, and at least one global state MLP to generate a global state for the transformed configuration; and determining, based on the transformed configuration of the transformed nodes and edges of the second graph representation with the clustering configuration indicative of the anomaly of the nodes and edges of the first graph representation and of the multi-field record, a probability that the multi-field record is anomalous.

2. The method of claim 1, wherein determining the probability that the multi-field record is anomalous comprises:

processing the transformed configuration of the transformed nodes and edges for the multi-field record with a global attention module to generate a resultant vector of values; and applying a softmax module to the resultant vector of values to derive the probability that the multi-field record is anomalous.

3. The method of claim 2, wherein processing the transformed configuration of the transformed nodes and edges comprises:

deriving an output node vector, $V_{output}$, as an average of weighted products of vector representations of the transformed nodes according to:

$$V_{output}(v_1, v_2, \ldots, v_d) = \frac{w_a(a_1, a_2, \ldots, a_d) + w_b(b_1, b_2, \ldots, b_d) + w_n(n_1, n_2, \ldots, n_d)}{n},$$

where $V_{output}$ is the output node vector, each of a, b, . . . , n is one of the transformed nodes of the transformed graph representation, and $w_a$, . . . $w_n$ are the respective weights applied to the d-dimensional vector representation of each of the transformed nodes.

4. The method of claim 1, wherein transforming by the machine learning graph convolution system the first graph representation comprises, for a particular edge of the edges of the first graph representation:

generating a corresponding edge vector based on an edge value representing the particular edge, node values representative of a respective source node and destination node in the first graph representation for the particular edge, and a current global state vector associated with the first graph representation; and applying the edge MLP to the edge vector to generate a resultant transformed edge corresponding to the particular edge.

5. The method of claim 1, wherein transforming by the machine learning graph convolution system the first graph representation comprises, for a particular node of the nodes of the first graph representation:

generating a corresponding node vector based on the particular node of the first graph representation and edges in the first graph representation connected to the particular node; and applying the node MLP to the corresponding node vector to generate a resultant transformed node corresponding to the particular node.

6. The method of claim 1 wherein transforming by the machine learning graph convolution system the first graph representation comprises:

generating an average node vector averaging the node representations of the nodes of the first graph representation;

generating a global composite vector based on the average node vector and a current global state vector; and providing the global composite vector to the global state MLP to generate a resultant transformed global state vector.

7. The method of claim 1, wherein the machine learning graph convolution system comprises at least one graph neural network system.

8. The method of claim 1, further comprising:

performing preprocessing on a received raw data record to produce the multi-field record, including performing one or more of: Gaussian normalization applied to the received raw data record, or removing one or more data elements of the received raw data record based on at least one of: entropy associated with the one or more data elements, sparseness associated with the one or more data elements, a p-value associated with the one or more data elements, or a low-effect size associated with the one or more data elements.

9. The method of claim 8, wherein removing one or more data elements comprises:

identifying a particular data element as a rare element in response to determining, based on training data to train a learning engine implementation for performing the preprocessing, that the particular data element is present in fewer than an adjustable threshold number of data records comprising the training data, wherein the adjustable threshold number is adjusted based on likelihood of occurrence of anomalous values for the particular data element; and removing from runtime data records the particular data element identified as the rare element.

10. A system for detection and classification of data, the system comprising:

an input stage to receive one or more input data records; and a controller, implementing one or more learning engines, in communication with one or more memory devices storing programmable instructions, configured to:

transform, by a plurality of multi-layer perceptrons (MLP's) of the controller, each 1-dimensional data value of a multi-field record into a respective multi-dimensional vector of a plurality of multi-dimensional vectors, with each data value of each field from the multi-field record being transformed by a respective different MLP, from the plurality of MLP's, that was separately trained to transform the respective field from the multi-field record;

convert the plurality of respective multi-dimensional vectors into a first graph representation comprising nodes and edges, wherein each of the plurality of the respective multi-dimensional vectors corresponds to a respective one of the nodes in the first graph representation, with the respective one of the nodes including value information representing feature information for the respective data value and positional information representing a relationship of the respective one of the nodes to other of the nodes in the first graph representation;

transform by a machine learning graph convolution system the first graph representation to a second, transformed, graph representation for the multi-field record, the second graph representation comprising a transformed configuration of transformed nodes and edges in the second graph representation in which the transformed nodes and edges are organized into a clustering configuration indicative of anomality of the nodes and edges of the first graph representation and of the multi-field record, wherein the machine learning graph convolution system comprises at least one edge MLP trained to transform each edge of the first graph representation into a transformed edge, at least one node MLP to transform each node of the first graph representation to a transformed node, and at least one global state MLP to generate a global state for the transformed configuration; and determine, based on the transformed configuration of the transformed nodes and edges of the second graph representation with the clustering configuration indicative of anomality of the nodes and edges of the first graph representation and of the multi-field record, a probability that the multi-field record is anomalous.

11. The system of claim 10, wherein the controller configured to determine the probability that the multi-field record is anomalous is configured to:

process the transformed configuration of the transformed nodes and edges for the multi-field record with a global attention module to generate a resultant vector of values; and apply a softmax module to the resultant vector of values to derive the probability that the multi-field record is anomalous.

12. The system of claim 11, wherein the controller configured to process the transformed configuration of the transformed nodes and edges is configured to:

derive an output node vector, $V_{output}$, as an average of weighted products of vector representations of the transformed nodes according to:

$$V_{output}(v_1, v_2, \ldots, v_d) =$$
$$\frac{w_a(a_1, a_2, \ldots, a_d) + w_b(b_1, b_2, \ldots, b_d) + w_n(n_1, n_2, \ldots, n_d)}{n},$$

where $V_{output}$ is the output node vector, each of a, b, . . . , n is one of the transformed nodes of the transformed graph representation, and $w_a, \ldots w_n$ are the respective weights applied to the d-dimensional vector representation of each of the transformed nodes.

13. The system of claim 10, wherein the controller configured to transform by the machine learning graph convolution system the first graph representation is configured, for a particular edge of the edges of the first graph representation:

generate a corresponding edge vector based on an edge value representing the particular edge, node values representative of a respective source node and destination node in the first graph representation for the particular edge, and a current global state vector associated with the first graph representation; and apply the at least one edge MLP to the edge vector to generate a resultant transformed edge corresponding to the particular edge.

14. The system of claim 10, wherein the controller configured to transform by the machine learning graph convolution system the first graph representation is configured to, for a particular node of the nodes of the first graph representation:

generate a corresponding node vector based on the particular node of the first graph representation and edges in the first graph representation connected to the particular node; and apply the at least one node MLP to the corresponding node vector to generate a resultant transformed node corresponding to the particular node.

15. The system of claim 10, wherein the controller configured to transform by the machine learning graph convolution system the first graph representation is configured to:

generate an average node vector averaging the node representations of the nodes of the first graph representation;

generate a global composite vector based on the average node vector and a current global state vector; and provide the global composite vector to the global state MLP to generate a resultant transformed global state vector.

16. The system of claim 10, wherein the controller configured to transform by the machine learning graph convolution system the first graph representation is configured to apply the graph convolution process using at least one graph neural network system.

17. The system of claim 10, wherein the controller is further configured to:

perform preprocessing on a received raw data record to produce the multi-field record, including to perform one or more of: Gaussian normalization applied to the received raw data record, or remove one or more data elements of the received raw data record based on at least one of: entropy associated with the one or more data elements, sparseness associated with the one or more data elements, a p-value associated with the one or more data elements, or a low-effect size associated with the one or more data elements.

18. The system of claim 17, wherein the controller configured to remove one or more data elements is configured to:

identify a particular data element as a rare element in response to determining, based on training data to train a learning engine implementation for performing the preprocessing, that the particular data element is present in fewer than an adjustable threshold number of data records comprising the training data, wherein the adjustable threshold number is adjusted based on likelihood of occurrence of anomalous values for the particular data element; and remove from runtime data records the particular data element identified as the rare element.

19. A non-transitory computer readable media storing a set of instructions, executable on at least one programmable device, to:

transform by a plurality of multi-layer perceptrons (MLP's) each 1-dimensional data value of a multi-field record into a respective multi-dimensional vector of a plurality of multi-dimensional vectors, with each data value of each field from the multi-field record being transformed by a respective different MLP, from the plurality of MLP's, that was separately trained to transform the respective field from the multi-field record;

convert the plurality of respective multi-dimensional vectors into a first graph representation comprising nodes and edges, wherein each of the plurality of the respective multi-dimensional vectors corresponds to a respective one of the nodes in the first graph representation, with the respective one of the nodes including value information representing feature information for the respective data value and positional information representing a relationship of the respective one of the nodes to other of the nodes in the first graph representation;

transform a machine learning graph convolution system the first graph representation to a second, transformed, graph representation for the multi-field record, the second graph representation comprising a transformed configuration of transformed nodes and edges in the second graph representation in which the transformed nodes and edges are organized into a clustering configuration indicative of anomality of the nodes and edges of the first graph representation and of the multi-field record, wherein the machine learning graph convolution system comprises at least edge MLP trained to transform each edge of the first graph representation into a transformed edge, at least one node MLP to transform each node of the first graph representation to a transformed node, and at least one global state MLP to generate a global state for the transformed configuration; and determine, based on the transformed configuration of the transformed nodes and edges of the second graph representation with the clustering configuration indicative of anomality of the nodes and edges of the first graph representation and of the multi-field record, a probability that the multi-field record is anomalous.

20. The computer readable media of claim 19, wherein the set of instructions to determine the probability that the multi-field record is anomalous comprises one or more instructions to:

process the transformed configuration of the transformed nodes and edges for the multi-field record with a global attention module to generate a resultant vector of values; and apply a softmax module to the resultant vector of values to derive the probability that the multi-field record is anomalous.

\* \* \* \* \*